(12) United States Patent
Koda

(10) Patent No.: US 9,191,472 B2
(45) Date of Patent: Nov. 17, 2015

(54) PORTABLE TERMINAL, DISPLAY CONTROL PROGRAM AND DISPLAY CONTROL METHOD

(75) Inventor: Hideki Koda, Nagaokakyo (JP)

(73) Assignee: KYOCERA Corporation, Kyoto (JP)

( * ) Notice: Subject to any disclaimer, the term of this patent is extended or adjusted under 35 U.S.C. 154(b) by 229 days.

(21) Appl. No.: 13/637,637

(22) PCT Filed: Mar. 24, 2011

(86) PCT No.: PCT/JP2011/001734
§ 371 (c)(1),
(2), (4) Date: Sep. 26, 2012

(87) PCT Pub. No.: WO2011/118217
PCT Pub. Date: Sep. 29, 2011

(65) Prior Publication Data
US 2013/0021284 A1  Jan. 24, 2013

(30) Foreign Application Priority Data
Mar. 26, 2010 (JP) .................. 2010-072546

(51) Int. Cl.
*G06F 3/048* (2013.01)
*H04M 1/02* (2006.01)
(Continued)

(52) U.S. Cl.
CPC ............ *H04M 1/0235* (2013.01); *G06F 1/162* (2013.01); *G06F 1/1624* (2013.01); *G06F 1/1643* (2013.01); *G06F 1/1647* (2013.01); *G06F 1/1677* (2013.01); *G06F 3/0487* (2013.01);
(Continued)

(58) Field of Classification Search
CPC ...... G06F 3/048; G06F 1/1677; G06F 1/1616
USPC ................... 345/156, 173, 102, 520
See application file for complete search history.

(56) References Cited

U.S. PATENT DOCUMENTS

2005/0083642 A1\* 4/2005 Senpuku et al. ............... 361/681
2006/0082518 A1\* 4/2006 Ram ............................. 345/1.1
(Continued)

FOREIGN PATENT DOCUMENTS

| JP | 2005-252969 A | 9/2005 |
| JP | 2009-164794 A | 7/2009 |
| WO | 03/077097 A1 | 9/2003 |

OTHER PUBLICATIONS

International Search Report dated Jul. 5, 2011, issued for International Application No. PCT/JP2011/001734.

*Primary Examiner* — Amare Mengistu
*Assistant Examiner* — Shawna Stepp Jones
(74) *Attorney, Agent, or Firm* — Procopio, Cory, Hargreaves, and Savitch, LLP

(57) ABSTRACT

A mobile terminal composed of relatively movable first and second bodies has a display unit that displays an image and is provided on the first body and a touch panel that displays an image, detects contact made thereon, and is provided on the second body. When the mobile terminal switches from an open state to a closed state, if the touch panel has detected contact between the most recent switching from the closed state to the open state and the switching from the open state to the closed state, the display unit displays the image that has been displayed on the touch panel prior to the detection, the open state being a state in which the touch panel is viewable, the closed state being a state in which the display unit is viewable and at least part of the touch panel is covered by the first body.

6 Claims, 7 Drawing Sheets

(51) Int. Cl.
  *G06F 1/16* (2006.01)
  *G06F 3/0487* (2013.01)
  *G06F 3/0488* (2013.01)
  *G06F 3/14* (2006.01)
(52) U.S. Cl.
  CPC ............ *G06F 3/0488* (2013.01); *G06F 3/1423* (2013.01); *H04M 1/022* (2013.01); *H04M 2250/16* (2013.01); *H04M 2250/22* (2013.01)

(56) References Cited

U.S. PATENT DOCUMENTS

2010/0285845 A1   11/2010  Sawada et al.
2011/0115737 A1*  5/2011  Fuyuno et al. ................ 345/173
2011/0273387 A1*  11/2011  Urawaki et al. ............... 345/173

* cited by examiner

PORTABLE TERMINAL, DISPLAY CONTROL PROGRAM AND DISPLAY CONTROL METHOD

TECHNICAL FIELD

The present invention relates to a mobile terminal such as a mobile phone having a plurality of displays, and in particular to improvement of a user interface.

BACKGROUND ART

Mobile terminals equipped with two displays are known.

There are also flip-type or sliding-type mobile terminals that can be opened and closed. Such a mobile terminal can be small, or compact in size, when closed.

In the case where a mobile terminal having two displays A and B is realized with a flip-type terminal, for example, the displays may be arranged such that the two displays A and B are viewable when the terminal is in its open state, but only the display A is viewable and the display B is hidden behind when the terminal is in its closed state.

If a user, however, wishes to continue seeing images displayed on the display B, the mobile terminal cannot be closed to be compact.

As an approach to solve this problem, there has been known a scheme of causing the display A to show a screen that has been displayed on the hidden display B when the mobile phone in its closed state receives a predetermined user operation (For example, Patent Literature 1).

CITATION LIST

Patent Literature

[Patent Literature 1]
Japanese Patent Application Publication No. 2005-252969

SUMMARY OF INVENTION

Technical Problem

According to the approach disclosed in the above Patent Literature 1, when the state of the mobile phone is switched from the open state to the closed state and a screen that a user wishes to see is not displayed on the display A which is viewable when the mobile phone is in the closed state, the user cannot see the intended screen until performing a specific operation to cause the display A to show the screen that has been shown on the hidden display B.

Considering the user's convenience, it is more desirable that the display screen A automatically displays the intended screen without the specific operation.

The present invention has been achieved in view of the above problem, and an aim thereof is to provide a mobile terminal that can be opened and closed such as a flip-type terminal or a sliding-type terminal, and increases the possibility of showing the user a screen that he/she wishes to see without requiring a specific user operation, even in the closed state.

Solution to Problem

In order to solve the above problems, a mobile terminal pertaining to the present invention is a mobile terminal including a first body and a second body, the bodies being movable relative to each other, the mobile terminal comprising: a display unit provided on the first body and configured to display an image; a touch panel provided on the second body, and configured to display an image and to detect contact made thereon; a detection unit configured to detect switching of a state of the mobile terminal from an open state to a closed state, the open state being a state in which the touch panel is viewable, the closed state being a state in which the display unit is viewable and at least part of the touch panel is covered by the first body; a determination unit configured to determine, when the detection unit detects the switching of the state, whether the touch panel has detected contact made thereon between the most recent switching from the closed state to the open state and the detected switching from the open state to the closed state; and a control unit configured to perform continuous displaying when the determination unit determines positively, the continuous displaying being processing for causing the display unit to display an image that is the same as an image that has been displayed on the touch panel prior to the detection.

The components of the touch panel include a display unit such as a display.

Advantageous Effects of Invention

The mobile terminal pertaining to the present invention with the above structure can increase the possibility of showing the user a screen that he/she wishes to see without requiring a specific user operation even in the closed state.

DESCRIPTION OF EMBODIMENT

In the following, description is made on a mobile terminal pertaining to an embodiment of the present invention, taking a mobile phone as an example.

Embodiment

<Configuration of Apparatus>

First, description is made on configuration of the mobile phone 100 pertaining to the present embodiment.

Figure 1A:
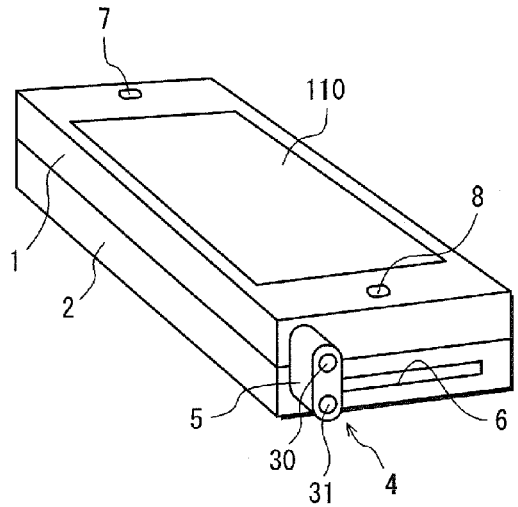
FIG. 1A shows an appearance of a mobile phone 100 pertaining to an embodiment in a closed state.
Figure 1B:
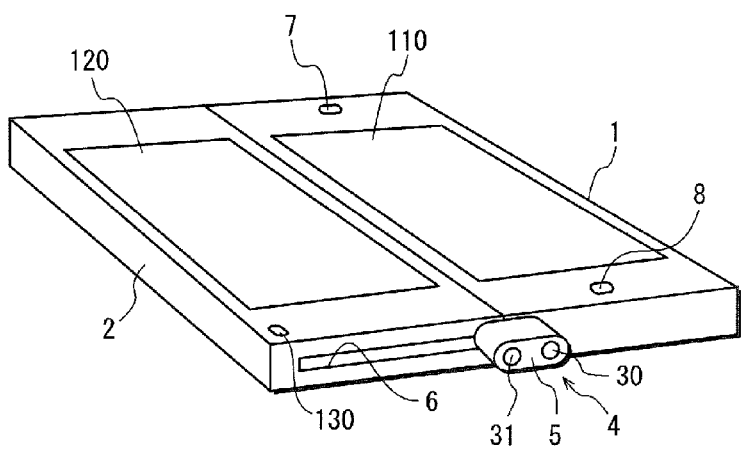
FIGS. 1B and 1C each show an appearance of the mobile phone 100 in an open state.
Figure 1C:
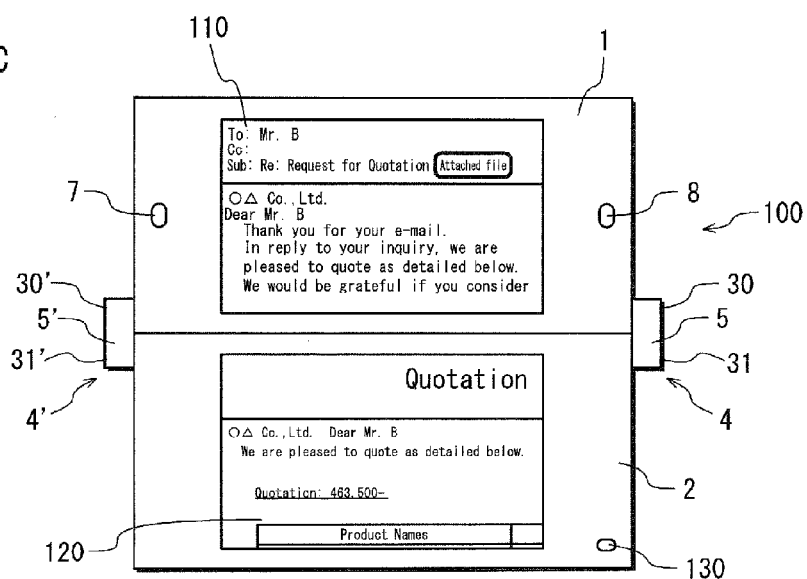

FIG. 1A is a perspective view showing an appearance of the mobile phone 100 in a closed state. FIG. 1B is a perspective view showing an appearance of the mobile phone 100 in an open state. FIG. 1C is a front view showing an appearance of the mobile phone 100 in an open state.

As shown in FIGS. 1A-1C, the mobile phone 100 is a sliding-type terminal including a first body 1, a second body 2 and coupling mechanisms 4 and 4'. The first body 1 and the second body 2 are movable relative to each other. Each of the coupling mechanisms 4 and 4' couples the first body 1 and the second body 2 together.

The first body 1 is equipped with a touch panel 110, a speaker 7 and a microphone 8. The second body 2 is equipped with a touch panel 120 and an open/close detection sensor 130.

The open/close detection sensor determines whether the mobile phone 100 is in the open state or in the closed state, as described later.

As shown in FIGS. 1A and 1B, a guide groove 6 is formed in a lateral side of the second body 2 in which the coupling mechanism 4 is provided. Similarly, another guide groove is formed in a lateral side of the second body 2 in which the coupling mechanism 4' is provided.

As shown in FIGS. 1A and 1B, the coupling mechanism 4 has a coupling piece 5 and pins 30 and 31 to couple a lateral side of the first body 1 and a lateral side of the second body 2. Similarly, as shown in FIG. 1C, the coupling mechanism 4' has a coupling piece 5' and pins 30' and 31'.

The pins 30 and 30' are each pivotally supported by the first body 1. Each of the pins 31 and 31' engages a corresponding guide groove. By each of the pins 31 and 31' sliding along the corresponding guide groove, the first body 1 and the second body 2 move relative to each other.

As shown in FIG. 1A, when the mobile phone 100 is in a closed state, the touch panel 120 is not viewable from the outside as the first body 1 is placed on the top of the second body 2. By each of the pins 31 and 31' of the respective coupling mechanism 4 and 4' sliding along a corresponding guide groove, the first body 1 moves along a surface of the second body 2. Then, by the pins 30 and 30' respectively rotating about the pins 31 and 31', the mobile phone 100 is switched to an open state in which a surface of the first body 1 and the surface of the second body 2 lie in approximately the same plane, as shown in FIGS. 1B and 1C. When the mobile phone 100 is in an open state, the touch panels 110 and 120 is viewable from the outside.

In the following explanation, touching an icon or a button (hereinafter, also referred to as "object") displayed on each touch panel with the user's finger and the like is also referred to as selecting an object.

<Screen Example>

Figure 2A:
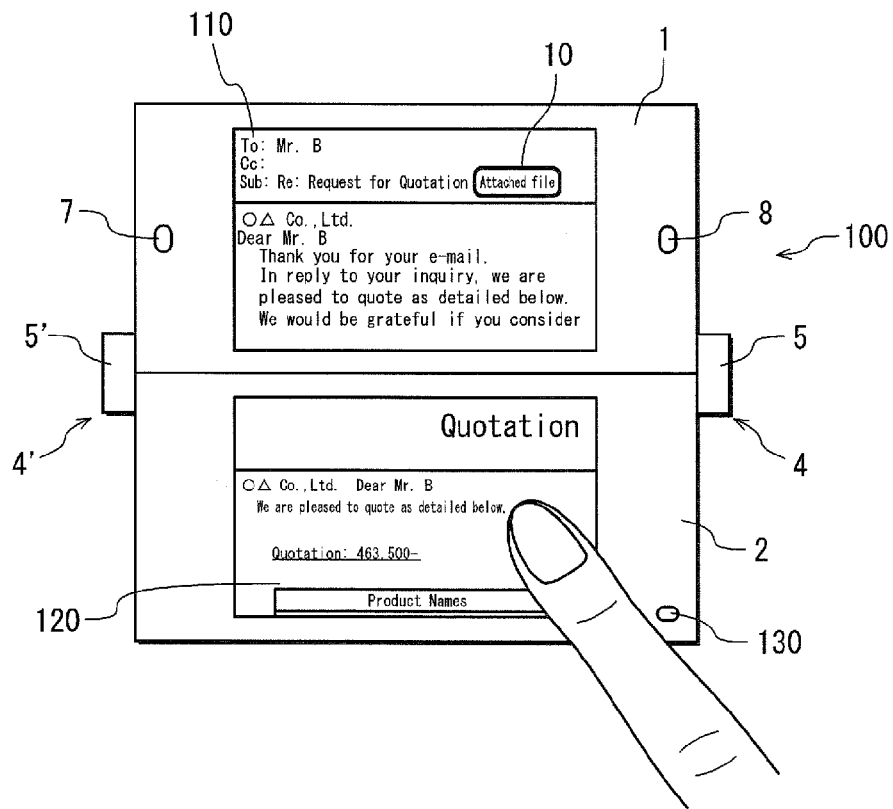
FIGS. 2A-2B show examples of screens of the mobile phone 100 and an example of a user operation.
Figure 2B:
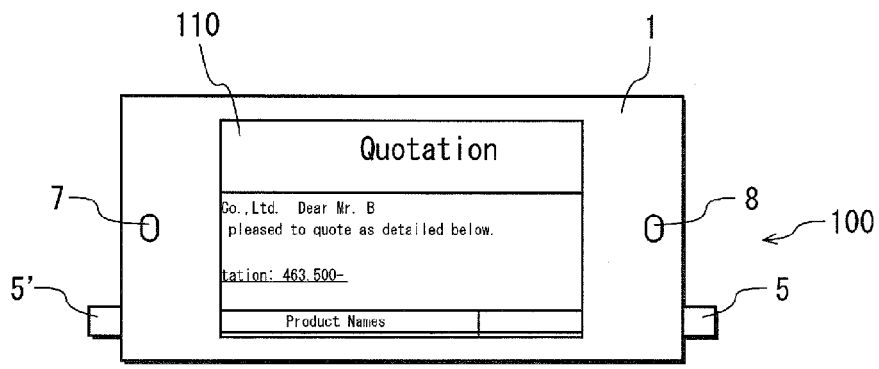
Figure 3:
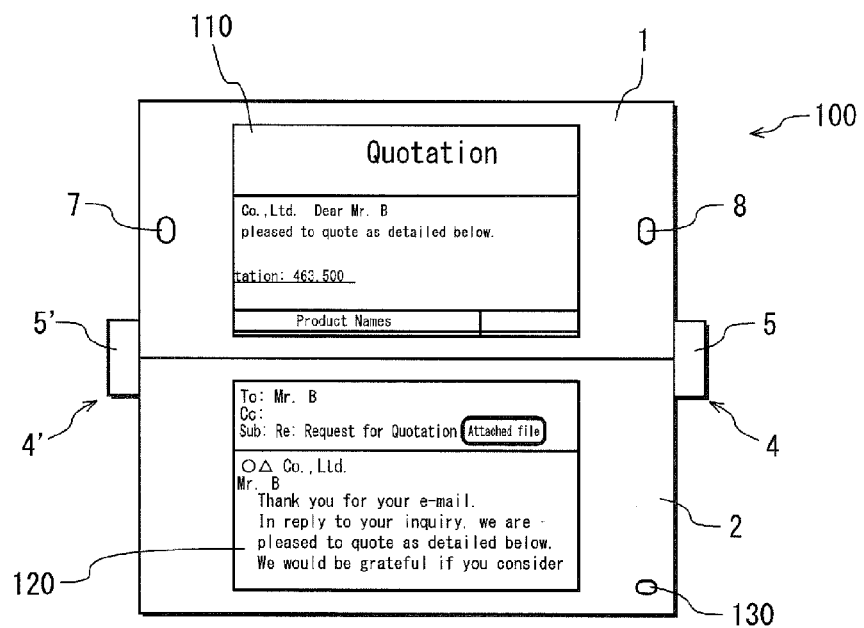
FIG. 3 shows an example of screens of the mobile phone 100.

Next, description is made on examples of screens with reference to FIGS. 2A-2B and FIG. 3.

FIGS. 2A-2B show examples of screens of the mobile phone 100 and an example of a user operation. FIG. 3 shows an example of screens of the mobile phone 100.

In FIG. 2A, the touch panel 110 displays a text of a received mail (hereinafter, referred to as "mail screen"), the touch panel 120 displays a text of a file attached to the received mail (hereinafter, referred to as "quotation screen"), and a user is scrolling the quotation screen.

Selecting an attached file button 10, which is positioned on the mail screen, displays the quotation screen.

When a user switches the mobile phone 100 from the open state to the closed state immediately after performing an operation on the touch panel 120 as shown in FIG. 2A, the mobile phone 100 causes the touch panel 110 to display a screen that is the same as the quotation screen that has been operated immediately before detecting the switching from the open state to the closed state, instead of the mail screen that has been displayed on the touch panel 110, as shown in FIG. 2B.

The quotation screen displayed on the touch panel 120 in FIG. 2A is scrolled to be the quotation screen displayed on the touch panel 110 as a result of scrolling.

As described above, when the mobile phone 100 is in the open state, the touch panels 110 and 120 are viewable, and when the mobile phone 100 is switched from the open state to the closed state, only the touch panel 110 is viewable.

Accordingly, when detecting switching from the open state to the closed state, the mobile phone 100 causes the touch panel 110 to display a screen that is the same as a screen that has been displayed on one of the touch panel 110 and 120 that has been operated by the user in the open state immediately before the detection.

The reason why such an operation is performed is that when the mobile phone 100 is switched from the open state to the closed state, the user is assumed to wish to continue seeing the screen of the touch panel that he/she operated immediately before the switching.

Depending on which touch panel is operated by the user immediately before switching from the open state to the closed state, the mobile phone 100 thus automatically determines and displays a screen that the user would wish to see when the mobile phone 100 is in the closed state. This increases the possibility that the user can continue seeing the intended screen without performing a specific operation for switching screens.

When the mobile phone 100 is switched by the user from the closed state shown in FIG. 2B to the open state, as shown in FIG. 3, the mobile phone 100 causes the touch panel 110 to continue displaying the quotation screen that has been displayed on the touch panel 110 in FIG. 2B, and causes the touch panel 120 to display a screen that is the same as the mail screen that has been displayed on the touch panel 110 in FIG. 2A. That is, the mail screen and the quotation screen are displayed on the touch panels different from the touch panels displaying these screens in FIG. 2A.

<Functional Structure>

Figure 4:
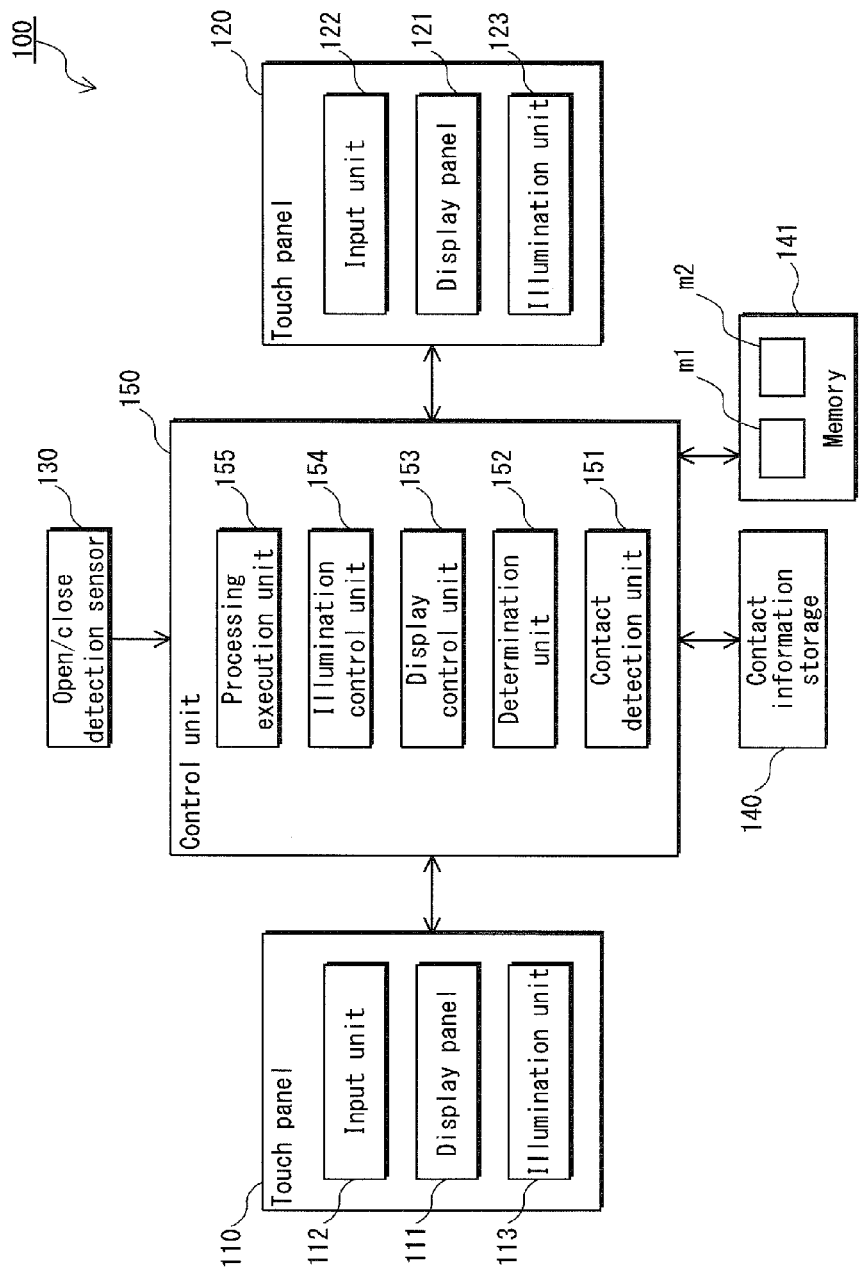
FIG. 4 is a block diagram showing a functional structure of main components of the mobile phone 100.

FIG. 4 is a block diagram showing a functional structure of main components of the mobile phone 100.

As shown in FIG. 4, the mobile phone 100 is equipped with the touch panels 110 and 120, the open/close detection sensor 130, a contact information storage 140, a memory 141 and a control unit 150.

A communication unit, which a typical mobile phone includes, and the speaker 7, the microphone 8 and the like, which are shown in FIGS. 1A, 1B and 1C are omitted from FIG. 4. The mobile phone 100 also includes a processor and a memory. Each function of the control unit 150 is achieved by the processor executing a program stored in the memory.

The touch panel 110 includes a display panel 111, an input unit 112 and an illumination unit 113. Similarly, the touch panel 120 includes a display panel 121, an input unit 122 and an illumination unit 123.

Each of the display panels 111 and 121 includes a Liquid Crystal Display (LCD). Each of the display panels 111 and 121 is a circuit for displaying images such as characters and icons on the LCD upon instructed by the control unit 150. In the present embodiment, the number of pixels of each LCD is 800×480 (width×height).

Each of the input units is a circuit for detecting contact made by a user. During detection, each of the input units outputs, to the control unit 150, coordinates (x, y) of a position to which contact has been made at each time interval (e.g. every 25 ms).

Hereinafter, description is made based on the premise that coordinates at an upper left position and coordinates at a lower right position of each touch panel shown in FIG. 1C are respectively (0, 0) and (799, 479). Each input unit is embodied, for example, as a capacitance-type touch sensor.

Each of the illumination units are a backlight for illuminating a corresponding display panel, and turns on or off according to instructions from the control unit 150.

The open/close detection sensor 130 outputs a signal (hereinafter, referred to as "detection signal") indicating whether the mobile phone 100 is in the open state or in the closed state. Such a function is realized by a Hall sensor, for example, that detects a magnetic force generated by a magnet embedded in the first body 1.

The contact information storage 140 is a memory region for storing information (hereinafter, referred to as "contact information") including coordinates output from each input unit, time at which the coordinates have been received, and information indicating one of the touch panels including the input unit that has output the coordinates (hereinafter, referred to "panel number").

The memory 141 is a memory region having two regions m1 and m2. The regions m1 and m2 store therein data constituting a screen displayed on each display panel (hereinafter, referred to as "image data").

The control unit 150 in particular includes, other than the functions which a typical mobile phone includes, the function of controlling a screen on each display panel based on the detection signal received from the open/close detection sensor 130. The control unit 150 includes a contact detection unit 151, a determination unit 152, a display control unit 153, an illumination control unit 154 and a processing execution unit 155.

The contact detection unit 151 detects contact made on each touch panel based on the coordinates output from each input unit, and stores, in the contact information storage 140, the contact information including the acquired coordinates, the time at which the coordinates have been received, and the panel number. The time is acquired by using values continually acquired by an unillustrated counter (for example, in units of 1 ms).

In the present embodiment, the contact detection unit 151 stores "1" as the panel number when the input unit 112 outputs the coordinates, and stores "2" as the panel number when the input unit 122 outputs the coordinates, as an example.

The determination unit 152 determines whether specific contact has been made when the detection signal output from the open/close detection sensor 130 indicates that the open state switches to the closed state. The determination is based on the contact information that is stored in the contact information storage 140 and includes the latest time (hereinafter, referred to as "latest contact information").

Specific contact is made on the touch panel 120 within the time period between the most recent switching from the closed state to the open state and the current time, and in particular, within a time period from a point predetermined time (10 seconds, for example) before the current time until the current time.

The determination unit 152 manages information indicating whether the mobile phone 100 is in the open state or in the closed state (hereinafter, referred to as "condition information"). The condition information is stored in the memory 141. When the detection signal output from the open/close detection sensor 130 is switched, the determination unit 152 updates the condition information to indicate a state after the switching. In the present embodiment, the determination unit 152 updates the condition information to "0" when the detection signal switches to indicate the open state, and updates the condition information to "1" when the detection signal switches to indicate the closed state, as an example.

The display control unit 153 manages correspondence of the two regions m1 and m2 in the memory 141 to the display panels 111 and 121, respectively. The display control unit 153 controls a screen of each display panel based on the correspondence and the condition information managed by the determination unit 152. Control of a screen of each display panel will be described later in detail (see FIG. 5).

The display control unit 153 updates the correspondence based on determination performed by the determination unit 152 as to whether specific contact has been made. For example, in the case where the regions m1 and m2 correspond to the display panels 111 and 121, respectively, and the determination unit 152 determines that the specific contact has been made, the display control unit 153 updates the regions m1 and m2 to correspond to the display panels 121 and 111, respectively.

The display control unit 153 manages information indicating correspondence between the regions and the display panels (hereinafter, referred to as "correspondence information"). The correspondence information is stored in the memory 141. As an example, when the regions m1 and m2 correspond to the display panels 111 and 121, respectively, the correspondence information is set to "0", and when the regions m1 and m2 correspond to the display panels 121 and 111, respectively, the correspondence information is set to "1".

The illumination control unit 154 controls illumination of, in particular, the illumination unit 123 based on the condition information managed by the determination unit 152.

The processing execution unit 155 detects, based on coordinates included in the contact information stored in the contact information storage 140, a position at which contact is made, and executes processing corresponding to the position.

The processing corresponding to the position at which the contact is made has been allocated to an object (icon, button, etc.,) that is positioned in one of the touch panels indicated by the panel number included in the contact information, and is positioned at a position indicated by coordinates included in the contact information.

Based on the premise that the ranges m1 and m2 respectively correspond to the display panels 111 and 121, the processing execution unit 155 manages different pieces of information of objects (size, shape and coordinates) for each display panel that is to display the objects. The processing execution unit 155 determines, based on the information of objects and the correspondence information, whether a position at which contact has been made has an object.

That is, for example, when the stored contact information includes the panel number "1", it indicates that contact has been made on the touch panel 110. Depending on whether the correspondence information is "0" or "1", different pieces of information are referred to.

When the correspondence information is "0", the regions m1 and m2 correspond to the display panels 111 and 121, respectively. The processing execution unit 155 then refers to the information of objects for the display panel 111, and determines whether an object is provided at the position at which the contact has been made.

Even when the panel number included in the stored contact information is "1", if the correspondence information is "1", the regions m1 and m2 correspond to the display panels 121 and 111, respectively. The processing execution unit 155 then refers to the information of objects for the display panel 121, and needs to determine whether an object is provided at the position at which the contact has been made.

<Operation>

Figure 5:
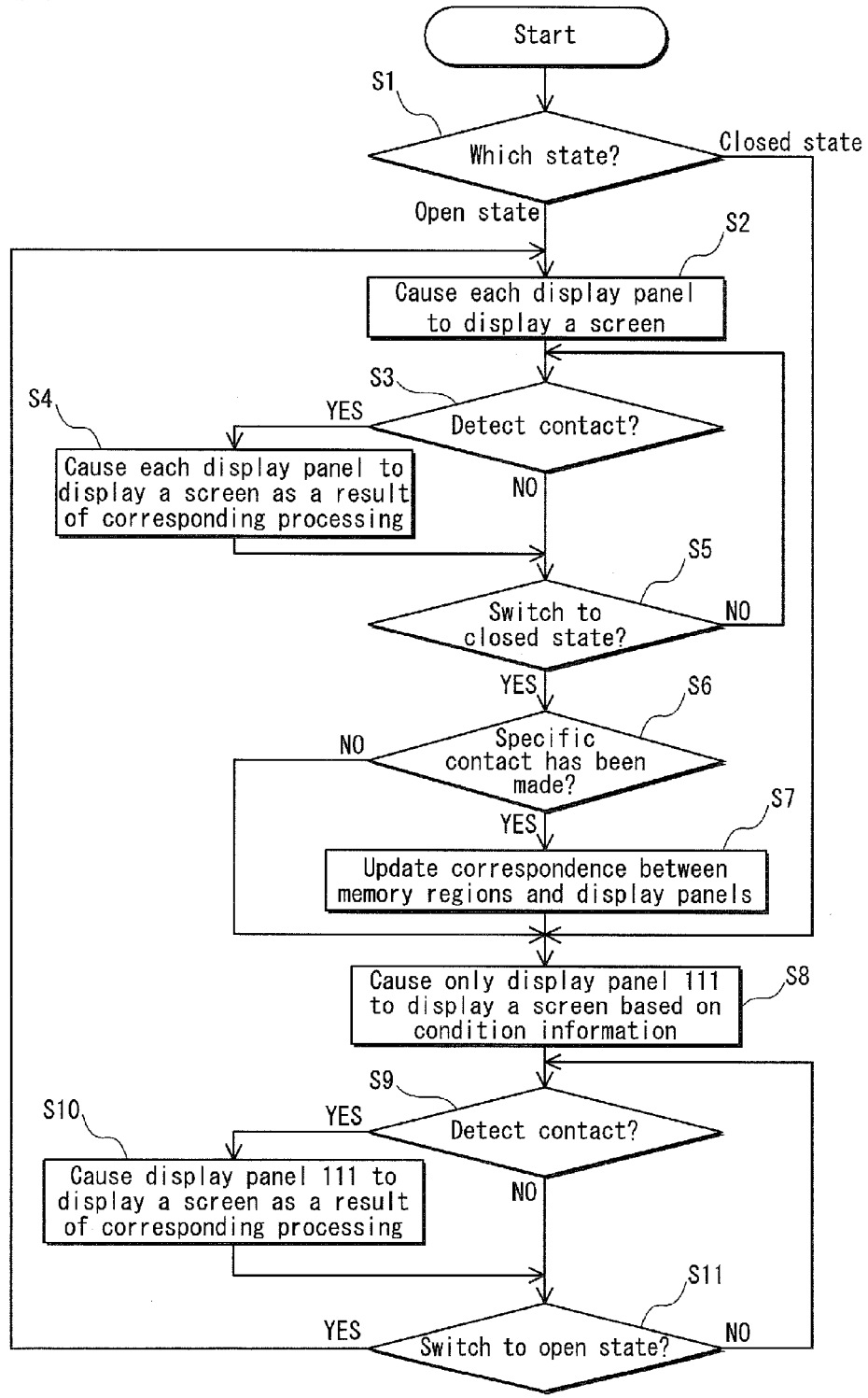
FIG. 5 is a flowchart showing a control processing performed by the mobile phone 100.

The following describes an operation of the mobile phone 100 having the above-mentioned structure with use of FIG. 5.

FIG. 5 is a flowchart showing a control processing performed by the mobile phone 100.

The control processing shown in FIG. 5 starts as the mobile phone 100 is turned on. Although not shown in FIG. 5, the control processing ends as the mobile phone 100 is turned off.

Although not shown in FIG. 5, when the mobile phone 100 is turned on, the display control unit 153 in the control unit 150 stores image data in the predetermined regions m1 and m2 of the memory 141, and sets the correspondence information to "0". The image data constitutes a standby screen stored in a non-volatile memory (unillustrated) included in the mobile phone 100.

As shown in FIG. 5, the determination unit 152 determines whether the detection signal output from the open/close detection sensor 130 indicates the open state or the closed state (step S1). When it indicates the closed state (step S1: closed state), the determination unit 152 sets the condition information to indicate the closed state, i.e., sets to "1". The control unit 150 then performs processing from later-described step S8.

When in step S1, the detection signal indicates the open state (step S1: open state), the determination unit 152 updates the condition information to indicate the open state, i.e., updates to "0". Based on the condition information indicating "0", the display control unit 153 causes the display panels 111 and 121 to respectively display the image data stored in the range m1 and the image data stored in the range m2, and the illumination control unit 154 illuminates both of the illumination units (step S2). Note that the determination unit 152 acquires the time at which the condition information has been updated to "0" by using values continually acquired by an unillustrated counter.

The contact detection unit 151 determines whether contact of user's finger, etc., has been made to one of the touch panels, based on whether coordinates are received from the input units 112 or 122 (step S3). When determining that contact has been made (step S3: YES), the contact detection unit 151 stores, in the contact information storage 140, the contact information including the received coordinates, the time at which the coordinates have been received, and the panel number. The processing execution unit 155 executes, based on the panel number and the coordinates that are included in the contact information stored by the contact detection unit 151, processing corresponding to a position at which contact has been made. The processing execution unit 155 then stores, in the regions m1 and m2, image data constituting screens displayed as a result of the processing. The display control unit 153 causes the display panel 111 to display the image data stored in the region m1, and causes the display panel 121 to display the image data stored in the region m2 (step S4).

For example, when an icon is provided on the display panel of the touch panel indicated by the panel number included in the stored contact information and located at a position indicated by the coordinates included in the contact information, the processing execution unit 155 executes processing allocated to the icon. The display control unit 153 causes each display panel to display a screen as a result of the processing.

When the position at which contact has been made is not provided with an object such as an icon and a corresponding processing, the processing execution unit 155 and the display control unit 153 do not execute any processing.

When the processing in step S4 is completed, or when contact has not been detected in step S3 (step S3: NO), the determination unit 152 determines whether the detection signal output from the open/close detection sensor 130 indicates the closed state (step S5). When it indicates the open state (step S5: NO), the processing returns to step S3.

When the detection signal indicates the closed state in step S5 (step S5: YES), the determination unit 152 updates the condition information to indicate the closed state, i.e., updates to "1". The determination unit 152 then determines, based on the latest contact information stored in the contact information storage 140, whether specific contact has been made (step S6).

That is, when the latest contact information includes the panel number "2" and the time that is at or after the most recent switching from the closed state to the open state and is within a predetermined time (in this example, 10 seconds) before the current time, the determination unit 152 determines that specific contact has been made.

When the latest contact information includes the panel number "1" and the time that is not at or after the most recent switching from the closed state to the open state or is not included within a predetermined time period (in this example, 10 seconds) before the current time (step S6: NO), the determination unit 152 determines that specific contact has not been made.

When it is determined in step S6 that specific contact has been made (step S6: YES), the display control unit 153 performs update such that the ranges m1 and m2 correspond to the display panels 121 and 111, respectively (step S7), and updates the correspondence information to "1".

When the processing in step S7 is completed, or when it is determined that specific contact has not been made in step S6 (step S6: NO), the display control unit 153 causes, based on the condition information indicating "1", the display panel 111 to display image data stored in the range corresponding to the display panel 111, and causes the display panel 121 to display no image (step S8). The illumination control unit 154 turns off the illumination unit 123.

When the display control unit 153 has executed the processing of the above step S7, the display panel 111 displays the image data stored in the range m2. That is, the display panel 111 displays a screen that is the same as a screen that has been displayed on the display panel 121 before the processing in step S8. When the display control unit 153 has not executed the processing in the above step S7, the display panel 111 displays the image data stored in the range m1. That is, the display panel 111 continues displaying a screen that has been displayed on the display panel 111 before the processing in step S8.

In a similar manner to step S3, the contact detection unit 151 determines whether contact of user's finger, etc., has been made to one of the touch panels (step S9). When determining that contact has been made (step S9: YES), the contact detection unit 151 stores the contact information in the contact information storage 140 in a similar manner to the positive determination in step S3 (step S9: YES).

The processing execution unit 155 executes, based on the panel number and the coordinates that are included in the contact information stored by the contact detection unit 151, processing corresponding to a position at which contact has been made. The processing execution unit 155 stores, in the regions m1 and m2, image data constituting screens displayed as a result of the processing. The display control unit 153 then causes the display panel 111 to display image data stored in the range corresponding to the display panel 111 (step S10).

When the position at which contact has been made is not provided with an object such as an icon and with a corresponding processing, the processing execution unit 155 and the display control unit 153 do not execute any processing in a similar manner to step S4.

When the processing in step S10 is completed, or when contact has not been detected in step S9 (step S9: NO), the determination unit 152 determines whether the detection signal output from the open/close detection sensor 130 indicates the open state (step S11). When it indicates the closed state (step S11: NO), the control unit 150 returns to step S9 and continues processing thereafter. When it indicates the open state (step S11: YES), the determination unit 152 updates the condition information to indicate the open state, i.e., updates the condition information to "0". The control unit 150 returns to step S2 and continues processing thereafter.

The determination unit 152 acquires the time at which the condition information has been updated to "0" by using values continually acquired by an unillustrated counter.

Specific Examples

The following describes an operation of the above-described mobile phone 100 with use of a specific example case shown in FIGS. 6A, 6B, 2A, 2B and 3, with reference to the flowchart in FIG. 5.

The following description is made under the presumption that the mobile phone 100 is in the open state. In the following example case, the user selects a mail icon 11 displayed on a standby screen shown in FIG. 6A, selects an attached file button 10 on a mail application screen shown in FIG. 6B, scrolls on a quotation screen shown in FIG. 2A, switches the mobile phone 100 to the closed state, and then switches the mobile phone 100 to the open state again. Selecting the mail icon 11 activates a mail application.

Figure 6A:
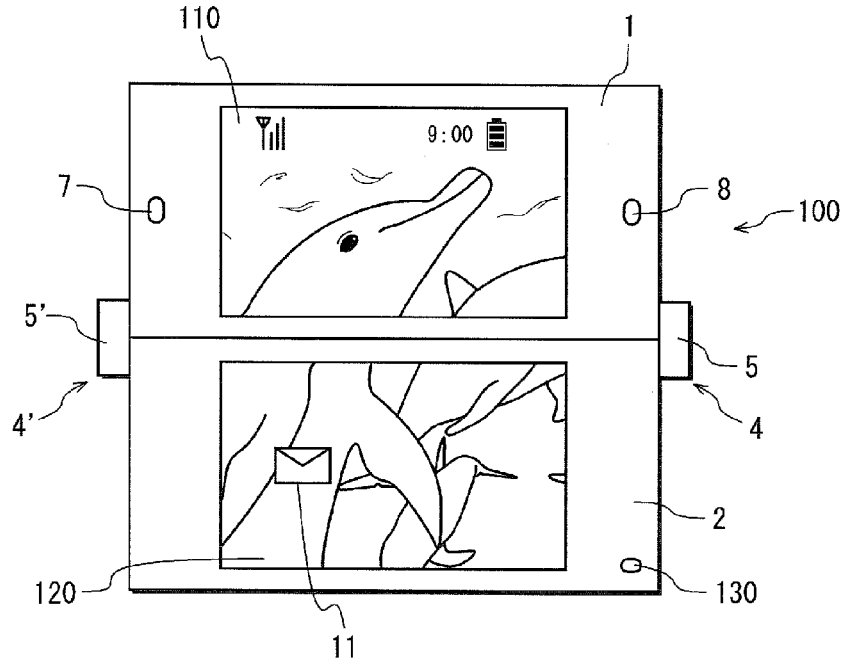
FIGS. 6A-6B each show an example of screens of the mobile phone 100.
Figure 6B:
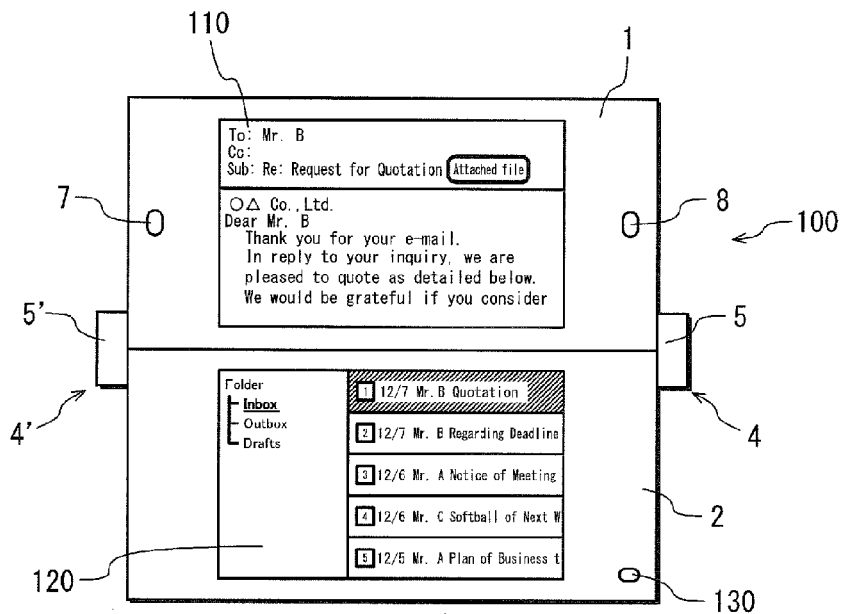

FIGS. 6A-6B each show an example of screens of the mobile phone 100.

As shown in FIG. 5, the determination unit 152 determines whether the detection signal output from the open/close detection sensor 130 indicates the open state or the closed state (step S1). In this example case, it indicates the open state (step S1: open state). The determination unit 152 updates the condition information to "0" and receives the update time. The display control unit 153 causes, based on the condition information indicating "0", the display panels 111 and 121 to respectively display image data stored in the ranges m1 and m2, and the illumination control unit 154 turns on each illumination unit (step S2).

In this example case, the mobile phone 100 has been just turned on, and each display panel displays a standby screen as shown in FIG. 6A, for example.

The contact detection unit 151 determines whether contact of user's finger, etc., has been made on one of the touch panels (step S3). In this example case, the user selects the mail icon 11 shown in FIG. 6A and accordingly contact is detected (step S3: YES). The contact detection unit 151 stores the contact information in the contact information storage 140.

In this example case, the processing execution unit 155 executes, based on the panel number and the coordinates that are included in the contact information stored by the contact detection unit 151, processing for activating the mail application allocated to the mail icon 11 as processing corresponding to a position at which contact has been made. The display control unit 153 causes each display panel to display a screen of the activated mail application, as shown in FIG. 6B (step S4).

When the processing in step S4 is completed, the determination unit 152 determines whether the detection signal output from the open/close detection sensor 130 indicates the closed state (step S5). In this example case, it indicates the open state (step S5: NO), and the contact detection unit 151 determines whether contact of user's finger, etc., has been made to one of the touch panels (step S3). In this example case, the user selects the attached file button 10 shown in FIG. 6B and accordingly contact is detected (step S3: YES). The contact detection unit 151 stores the contact information in the contact information storage 140.

In this example case, the processing execution unit 155 executes processing for causing the display panel 121 to display a content of the attached file allocated to the attached file button 10, as shown FIG. 2A, as processing corresponding to a position at which contact has been made. The display control unit 153, as shown in FIG. 2A, causes the display panel 111 to continue displaying the mail screen and causes the display panel 121 to display the quotation screen (step S4).

Here, the processing for displaying a content of an attached file activates an application corresponding to a type of the attached file and displays the content of the attached file on the corresponding application. In the example in step S4, the attached file, i.e., a quotation file, has been created by using a word processor application. Accordingly, the word processor application is activated and the file is displayed on the word processor application.

When the processing in step S4 is completed, the determination unit 152 determines whether the detection signal output from the open/close detection sensor 130 indicates the closed state (step S5). In this example case, it indicates the open state (step S5: NO). The contact detection unit 151 determines whether contact of user's finger, etc., has been made to one of the touch panels (step S3). In this example case, the user scrolls on the quotation screen and accordingly contact is detected (step S3: YES), the contact detection unit 151 stores the contact information in the contact information storage 140.

In this example case, the processing execution unit 155 executes processing for scrolling the quotation screen as processing corresponding to a position at which contact has been made. The display control unit 153 causes the display panel 111 to continue displaying the mail screen and causes the display panel 121 to display the quotation screen after the scrolling processing has been performed (step S4)

When the processing in step S4 is completed, the determination unit 152 determines whether the detection signal output from the open/close detection sensor 130 indicates the closed state (step S5). In this example case, it indicates the closed state (step S5: YES). The determination unit 152 then updates the condition information to "1", and determines, based on the latest contact information stored in the contact information storage 140, whether specific contact has been made.

In this example case, the above scrolling is performed on the touch panel 120, and accordingly the latest contact information includes the panel number "2". If the latest contact information includes the time that is at or after the most recent switching from the closed state to the open state and is included within a predetermined time (in this example case, 10 seconds ago) before the current time, the determination unit 152 determines that specific contact has been made (step S6: YES). The display control unit 153 performs update such that the ranges m1 and m2 respectively correspond to the display panels 121 and 111 (step S7), and updates the correspondence information to "1".

When the processing in step S7 is completed, the display control unit 153 causes, based on the condition information indicating "1", the display panel 111 to display image data stored in the range m2 corresponding to the display panel 111 (the quotation screen after the scrolling) as shown in FIG. 2B, and causes the display panel 121 to display no image (step S8). The illumination control unit 154 turns off the illumination unit 123.

The contact detection unit 151 determines, in a similar manner to step S3, whether contact of user's finger, etc., has been made to one of the touch panels (step S9). In this example case, contact has not been detected (step S9: NO). The determination unit 152 determines whether the detection signal output from the open/close detection sensor 130 indicates the open state (step S11). In this example case, when it switches to indicate the open state (step S11: YES), the determination unit 152 updates the condition information to "0", and receives the update time.

The display control unit 153 causes, based on the condition information indicating "0", the display panel 111 to continue displaying the image data stored in the range m2 corresponding to the display panel 111 (the quotation screen after scrolling), and causes the display panel 121 to display the image data stored in the range m1 corresponding to the display panel 121 (the mail screen), and the illumination control unit 154 continues to turn on the illumination unit 113 and turns on the illumination unit 123 (step S2).

<Supplementary Explanation>

Although description has been made in the above of the mobile terminal in an embodiment of the present invention, it is to be understood that the present invention is not limited to the mobile terminal as description has been made in the present embodiment, and modifications as introduced below can be made without departing from the spirit and scope thereof.

(1) In the embodiment, when the mobile phone 100 is switched from the open state to the closed state after specific contact has been made by the user, the display panel 111 displays the original screen that has been displayed on the display panel 121 immediately before the switching. The display panel 111 may partially or entirely scale and display a screen that is the same as the screen that has been displayed on the display panel 121, or may display a modified screen that reflects the screen that has been displayed on the display panel 121.

The modified screen that reflects the screen that has been displayed on the display panel 121 maintains the information displayed in the screen that has been displayed on the display panel 121 but is different in appearance. Examples thereof include a screen with different layout of objects constituting the screen that has been displayed on the display panel 121 and a screen whose color is different from the color of the screen that has been displayed on the display panel 121.

In order to realize a modification for causing the display panel 111 to display the modified screen that reflects the screen that has been displayed on the display panel 121, screens should be newly created based on information of objects constituting each screen (size, shape, color and coordinates) so as to include the objects with different layout or color, and information of the objects should also be newly created in accordance with the newly created screens, for example. When the closed state is switched to the open state again, if the screens are displayed with the original color and layout, the newly created information of objects needs to be managed separately from the original information of objects.

In the embodiment, each display panel has the same number of pixels, and has substantially a rectangular shape. The display panels, however, may have the different numbers of pixels, and may have a circular shape or a polygonal shape. When the display panels 111 and 121 have the different numbers of pixels or different shapes, the above modification is effective. That is, it is effective that the display panel 111 partially or entirely scales and displays a screen that is the same as the screen that has been displayed on the above-described display panel 121, or the display panel 111 displays a modified screen that reflects the screen that has been displayed on the display panel 121.

(2) In the embodiment, as a specific example of the operation of the mobile phone 100, the mobile phone 100 that has been switched to the closed state is opened again without detecting contact made on the touch panel 110. As a result, display panel 111 included in the touch panel 110 shown in FIG. 2B and the display panel 111 included in the touch panel 110 shown in FIG. 3 display the same screen, and the display panel 111 included in the touch panel 110 shown in FIG. 2A and the display panel 121 included in the touch panel 120 shown in FIG. 3 display the same screen.

When the mobile phone 100 in the closed state detects contact made on the touch panel 110 (in FIG. 5, step S9: YES), the processing execution unit 155 executes processing corresponding to a position at which the contact has been made. The processing execution unit 155 stores, in the regions m1 and m2, image data constituting screens displayed as a result of the processing. It is therefore natural that the display panel 111 of the touch panel 110 shown in FIG. 2B and the display panel 111 of the touch panel 110 shown in FIG. 3 may display different screens. It is also natural that the display panel 111 of the touch panel 110 shown in FIG. 2A and the display panel 121 of the touch panel 120 shown in FIG. 3 may display different screens.

In the embodiment, after the mobile phone 100 is switched from the open state to the closed state and the display control unit 153 updates correspondence between the display panels and the ranges m1 and m2, the correspondence is not updated even if the mobile phone 100 is switched from the closed state to the opened state again. The display control unit 153, however, may reset the correspondence, i.e., may update the correspondence to the original correspondence used before the mobile phone 100 is switched from the open state to the closed state, and may perform display based on the updated correspondence. Alternatively, the correspondence may be reset only when a predetermined time period (for example, a few minutes) has not elapsed since the mobile phone 100 was switched from the open state to the closed state.

(3) In the embodiment, when the mobile phone 100 is switched from the open state to the closed state, the display panel 121 displays no images and the illumination unit 123 is turned off. The display panel 121, however, may continue displaying the images and only the illumination unit 123 may be turned off.

(4) Although the mobile phone 100 in the present embodiment has been described as a sliding-type mobile phone, a mobile phone having other exterior forms may be adopted. For example, a flip-type mobile phone 200 as shown in FIGS. 7A to 7C may be adopted.

The mobile phone 200 includes a first body 201 and a second body 202 that are joined in a mutually openable state. The first body 201 includes a touch panel 210. The second body 202 includes a touch panel 220 and an open/close detection sensor 230.

Figure 7A:
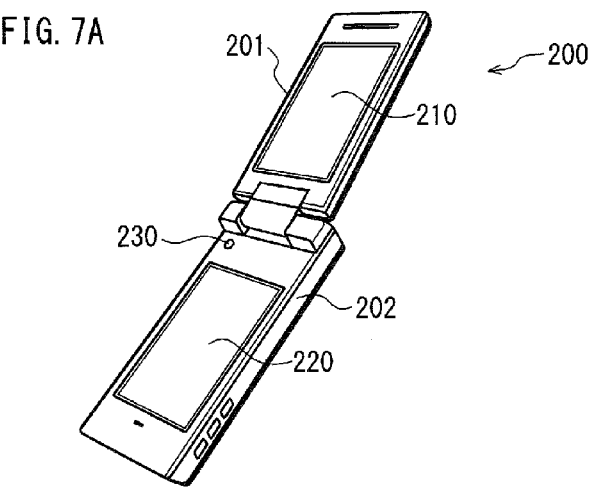
FIGS. 7A-7B each show an appearance of a mobile phone 200 in an open state.

As shown in FIG. 7A, when the mobile phone 200 is in an open state, both touch panels are viewable from the outside as the first body 201 and the second body 202 are mutually open. By rotating the first body 201 180 degrees with respect to the second body and then mutually closing the first body 201 and the second body 202, as shown in FIGS. 7B and 7C, the mobile phone 200 is switched to a closed state in which the touch panel 220 provided on the second body 202 is placed behind the first body 201 and thus only the touch panel 210 provided on the first body 201 is viewable from the outside.

Figure 7B:
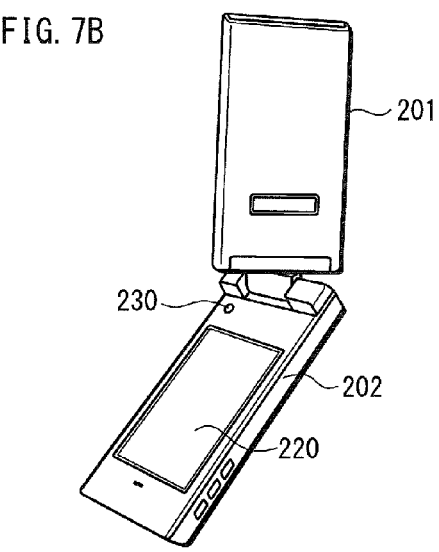
Figure 7C:
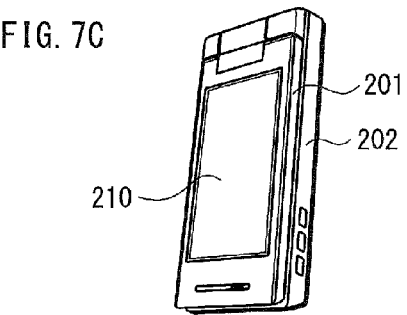
FIG. 7C shows an appearance of the mobile phone 200 in a closed state.

The user operates on the touch panel 220 shown in FIG. 7A and switches the mobile phone 200 to the closed state, as shown in FIGS. 7B and 7C, immediately after the operation. The touch panel 210 displays a screen that is the same as the screen that has been displayed on the touch panel 220 before the switching even when the mobile phone 200 is in the closed state, as shown in FIG. 7C. The user can thus see the screen displayed on the touch panel 220.

(5) The input unit of each touch panel in the present embodiment has been described to be embodied as a capacitance-type touch sensor. As such a capacitance-type touch sensor, an appropriate type is to be selected from various types of capacitance-type touch sensors. Types of touch sensors include: a projected capacitance-type touch sensor which includes multiple electrode patterns formed on a substrate composed of plastic, glass or the like and which can detect contact made to locations thereof by measuring ratios of amperages between different electrode patterns in the vicinity of the contact location; a surface capacitance-type touch sensor which includes a conductive layer, a substrate, and electrodes provided to the edges of the substrate, in which a uniform electrostatic field is formed by the conductive layer, and the contact location is detected by measuring a ratio between the amperages of the electrodes caused by the contact made thereto by a finger or the like.

Further, although the input unit of each touch panel has been described to be embodied as a capacitance-type touch sensor, the input unit is not limited to this. Alternatively, the input unit of each touch panel may be embodied as: an electromagnetic induction touch sensor, a matrix switch touch sensor, a resistive touch sensor, a surface acoustic wave touch sensor, an infrared touch sensor, an optical sensor touch sensor or the like. In further explanation of each of the types of the touch sensors, the electromagnetic induction touch sensor requires the use of a special pen such as an electronic pen, the matrix switch touch sensor is composed of transparent electrodes having two-layer structures, the resistive touch sensor includes two resistive layers and voltage is applied to one resistive layer and the other resistive layer detects changes in voltage according to locations on the one resistive layer to which contact has been made, the surface acoustic wave touch sensor detects contact made by a finger or the like by detecting the reflection of ultrasonic waves by monitoring the voltage changes of piezoelectric elements, the infrared touch sensor detects a location thereof to which contact has been made by a finger or the like by using shielded infrared beams, and the optical sensor touch sensor detects a location thereof to which contact has been made by using an optical sensor provided to the screen.

(6) In normal usage of the mobile phone 100 in the present embodiment, the touch panels 110 and 120 have been described to lie in approximately the same plane and to be arranged vertically when viewed from a user. The touch panels 110 and 120, however, may be arranged horizontally.

As shown in FIG. 1C, in the open state of the mobile phone 100 in the present embodiment, the touch panels 110 and 120 have been described to lie in approximately the same plane. The touch panels 110 and 120, however, may be arranged in any manner as long as each touch panel is viewable to a user.

For example, in the open state, the touch panels 110 and 120 may be arranged such that: a surface of the first body 1 that includes the touch panel 110 is approximately parallel to a surface of the second body 2 that includes the touch panel 120; or the surface of the first body 1 that includes the touch panel 110 is angled relative to the surface of the second body 2 that includes the touch panel 120 as long as each touch panel is viewable to a user.

(7) In the embodiment, the predetermined time period used for determining whether specific contact has been made is 10 seconds, as an example. The predetermined time period may be shorter (for example, five seconds) or longer (for example, one minute). The predetermined time period may be appropriately set by a user. Alternatively, the predetermined time period may be set at the time when the mobile phone 100 pertaining to the embodiment starts operating, based on a user operation performed on the touch panel 120 and a subsequent switching to the closed state.

The predetermined time period is used for determining whether specific contact has been made since, if a user has operated the touch panel 120 much earlier (for example, a few days ago) than the time when the mobile phone 100 is switched from the open state to the closed state, it is unlikely that a user wishes to see a screen that has been displayed on the touch panel 120 after the switching from the open state to the closed state. It is therefore desirable that the predetermined time period be set to this effect.

The predetermined time period may not be used for determining whether specific contact has been made, or a user may determine whether to use the predetermined time period for the determination. When the predetermined time is not used, it is determined that specific contact has been made when, in step S6 shown in FIG. 5, the latest contact information includes the panel number "2" and the time that is at or after the most recent switching from the closed state to the open state.

(8) The components on which explanation has been made in the present embodiment may be partially or entirely embodied as an integrated circuit having one chip or multiple chips. Further, the components may also be embodied as a computer program or as any type of embodiment.

The components explanation of which has been made in the present embodiment operate in a cooperative manner with the processor included in the mobile phone, and thus, realize the functions provided thereto.

(9) It may be conceived to distribute a program for causing a Central Processing Unit (CPU) to execute the processing in response to input from each touch panel (see FIG. 5) as explanation has been made in the present embodiment. The distribution of such a program may be realized by recording the program onto recording media, or transmitting the program via various communication paths. The recording media which may be used in such distribution of the program include IC cards, optical discs, flexible disks, ROMs, flash memories, and the like. The distributed program is to be stored in a memory or the like which may be read by the CPU provided to devices, so that the CPU may access and execute the program. Thereby, each of the functions of each of the mobile phones description has been made on in the present embodiment is to be realized.

In the above embodiment, examples of screens displayed on the touch panels 110 and 120 include a mail screen and a quotation screen. The present invention is, however, not limited to display these screens, and may display appropriate screens in the spirit and scope of the present invention.

In the above embodiment, the touch panels 110 and 120 display screens of different applications, i.e., screens of the mail application and the word processor application, instead of the original screens, for example. The present invention is, however, not limited to such a case, and the touch panels 110 and 120 may display screens according to one application.

For example, the touch panels 110 and 120 may display screens according to one image display application (e.g., map display application). In this case, the switching processing of the above embodiment for switching the touch panels 110 and 120 is performed on screens displayed according to the one image display application.

(10) Part or all of the modifications described in the above (1) to (9) may be combined and applied to the mobile phone 100 in the present embodiment.

(11) In the following, description is provided on a structure of a mobile terminal in one embodiment of the present invention as well as on modifications thereof. Additionally, description is made on the advantageous effects of such mobile terminals.

(a) A mobile terminal pertaining to an embodiment of the present invention includes a first body and a second body, the bodies being movable relative to each other, the mobile terminal comprising: a display unit provided on the first body and configured to display an image; a touch panel provided on the second body, and configured to display an image and to detect contact made thereon; a detection unit configured to detect switching of a state of the mobile terminal from an open state to a closed state, the open state being a state in which the touch panel is viewable, the closed state being a state in which the display unit is viewable and at least part of the touch panel is covered by the first body; a determination unit configured to determine, when the detection unit detects the switching of the state, whether the touch panel has detected contact made thereon between the most recent switching from the closed state to the open state and the detected switching from the open state to the closed state; and a control unit configured to perform continuous displaying when the determination unit determines positively, the continuous displaying being processing for causing the display unit to display an image that is the same as an image that has been displayed on the touch panel prior to the detection.

When contact made on the touch panel has been detected between the most recent switching from the closed state to the open state and the switching from the open state to the closed state, the mobile terminal pertaining to an embodiment of the present invention with the above structure causes the display unit, which is viewable in the closed state, to display an image that is the same as the image that has been displayed on the touch panel.

If the user has operated on the touch panel immediately before the mobile terminal is switched from the open state to the closed state, it is assumed that the user wishes to continue seeing the screen displayed on the touch panel. The predetermined time that is set relatively short can increase the possibility of showing the user a screen that he/she wishes to see without requiring a specific user operation.

(b) Also, the mobile terminal may further comprise a touch sensor configured to detect contact made on a surface of the display unit, wherein when the touch panel has detected the contact made thereon, the control unit performs the continuous displaying only when the touch sensor has detected no contact made thereon within a time period between when the touch panel has detected the contact and when the detection unit detects the switching from the open state to the closed state.

The mobile terminal pertaining to an embodiment of the present invention causes the display unit to display an image that is the same as the image that has been displayed on the touch panel when only the touch panel has detected the latest contact between the most recent switching from the closed state to the open state and the switching from the open state to the closed state.

This is because, if contact is detected on the touch sensor immediately before the mobile terminal is switched from the open state to the closed state, it is assumed that the user wishes to continue seeing the screen that has been displayed on the display unit instead of the screen that has been displayed on the touch panel, even after the mobile terminal is switched to the closed state.

The mobile terminal can, when the mobile terminal is switched from the open state to the closed state, further increase the possibility of showing the user a screen that he/she wishes to see on the display unit that is viewable in the closed state.

(c) Also, the touch panel may include an illumination unit that illuminates a display area thereof for displaying the image, and the control unit may cause the illumination unit to stop illuminating when the detection unit detects the switching from the open state to the closed state.

The mobile terminal pertaining to an embodiment of the present invention causes, when detecting the switching from the open state to the closed state, the first body to stop illuminating the display area defined in the touch panel, and can reduce power consumption.

(d) Also, the detection unit may further detect switching of the state of the mobile terminal from the closed state to the open state, and when the detection unit detects the switching from the closed state to the open state, if the control unit is performing the continuous displaying, the control unit may cause the touch panel to display an image that is the same as an image that has been displayed on the display unit immediately before the continuous displaying and may cause the illumination unit to resume illuminating, and if the control unit is not performing the continuous displaying, the control unit may cause the illumination unit to resume illuminating.

When detecting the switching from the closed state to the open state and the continuous displaying is being performed to cause the display unit to display an image that is the same as the image that has been displayed on the touch panel, the mobile terminal pertaining to an embodiment of the present invention causes the touch panel to display an image that is the same as the image that has been displayed on the display unit immediately before the continuous displaying. As a result, the display unit and the touch panel can be effectively used.

When detecting the switching from the closed state to the open state, the mobile terminal causes the display unit to continue displaying the image that has been displayed on the display unit as a result of the continuous displaying. This realizes natural display compared to the case where the mobile terminal causes the touch panel to redisplay an image that is the same as the image that is displayed on the display unit as a result of the continuous displaying.

(e) Also, the control unit may perform the continuous displaying only when the touch panel has detected contact made thereon within a predetermined time period before the detection.

As a result, when a user operates on the touch panel, leaves the mobile terminal in the open state for a while, e.g., a few hours, and then switches the mobile terminal to the closed state, the mobile terminal pertaining to an embodiment of the present invention can prevent the continuous displaying by setting the predetermined time period (for example, a few minutes). This is because when the user operates on the touch panel and switches the mobile phone from the open state to the closes state after a few hours, it is unlikely that the user wishes to continue seeing the screen displayed on the touch panel.

(12) For example, the touch sensor and the touch panel of the mobile terminal pertaining to the present invention correspond to the touch panels 110 and 120 of the mobile phone 100 pertaining to the embodiment. For example, the detection unit of the mobile terminal pertaining to the present invention corresponds to the open/close detection sensor 130 of the mobile phone 100 pertaining to the embodiment. For example, the determination unit and the control unit of the mobile terminal pertaining to the present invention correspond to the control unit 150 of the mobile phone 100 pertaining to the embodiment.

(13) The display control method of the present invention is achieved, for example, by the mobile phone 100 in the present embodiment (see, in particular, procedures for control processing described with reference to FIG. 5).

INDUSTRIAL APPLICABILITY

The mobile terminal pertaining to the present invention is used when a user performs operations with use of touch panels.

REFERENCE SIGNS LIST 1, 201 first body
2, 202 second body
4, 4' coupling mechanism
5 coupling piece
6 guide groove
7 speaker
8 microphone
30, 30', 31, 31' pin
100, 200 mobile phone
110, 120, 210, 220 touch panel
111, 121 display panel
112, 122 input unit
113, 123 illumination unit
130, 230 open/close detection sensor
140 contact information storage
141 memory
150 control unit
151 contact detection unit
152 determination unit
153 display control unit
154 illumination control unit
155 processing execution unit

The invention claimed is:

1. A mobile terminal including a first body and a second body, the bodies being movable relative to each other, the mobile terminal comprising:
a display unit provided on the first body and configured to display an image;
a touch panel provided on the second body, and configured to display an image and to detect contact made thereon;
a detection unit configured to detect switching of a state of the mobile terminal from an open state to a closed state, the open state being a state in which the touch panel is viewable, the closed state being a state in which the display unit is viewable and at least part of the touch panel is covered by the first body;
a determination unit configured to determine, when the detection unit detects the switching of the state, whether the touch panel has detected contact made thereon between the most recent switching from the closed state to the open state and the detected switching from the open state to the closed state;
a control unit configured to perform continuous displaying when the determination unit determines positively, the continuous displaying being processing for causing the display unit to display an image that is the same as an image that has been displayed on the touch panel prior to the detection; and
a touch sensor configured to detect contact made on a surface of the display unit, wherein when the touch panel has detected the contact made thereon, the control unit performs the continuous displaying only when the touch sensor has detected no contact made thereon within a time period between when the touch panel has detected the contact and when the detection unit detects the switching from the open state to the closed state.

2. The mobile terminal of claim 1, wherein the touch panel includes an illumination unit that illuminates a display area thereof for displaying the image, and the control unit causes the illumination unit to stop illuminating when the detection unit detects the switching from the open state to the closed state.

3. The mobile terminal of claim 2, wherein the detection unit further detects switching of the state of the mobile terminal from the closed state to the open state, and when the detection unit detects the switching from the closed state to the open state, if the control unit is performing the continuous displaying, the control unit causes the touch panel to display an image that is the same as an image that has been displayed on the display unit immediately before the continuous displaying and causes the illumination unit to resume illuminating, and if the control unit is not performing the continuous displaying, the control unit causes the illumination unit to resume illuminating.

4. A mobile terminal including a first body and a second body, the bodies being movable relative to each other, the mobile terminal comprising:
a display unit provided on the first body and configured to display an image;
a touch panel provided on the second body, and configured to display an image and to detect contact made thereon;
a detection unit configured to detect switching of a state of the mobile terminal from an open state to a closed state, the open state being a state in which the touch panel is viewable, the closed state being a state in which the display unit is viewable and at least part of the touch panel is covered by the first body;
a determination unit configured to determine, when the detection unit detects the switching of the state, whether the touch panel has detected contact made thereon between the most recent switching from the closed state to the open state and the detected switching from the open state to the closed state; and
a control unit configured to perform continuous displaying when the determination unit determines positively, the continuous displaying being processing for causing the display unit to display an image that is the same as an image that has been displayed on the touch panel prior to the detection;
wherein the control unit performs the continuous displaying only when the touch panel has detected contact made thereon within a predetermined time period before the detection.

5. A non-transitory computer-readable medium having stored thereon a display control program used for a mobile terminal including a first body and a second body, the bodies being movable relative to each other, the mobile terminal comprising:

a display unit provided on the first body and configured to display an image; and a touch panel provided on the second body, and configured to display an image and to detect contact made thereon, wherein the display control program comprises the steps of:

detecting switching of a state of the mobile terminal from an open state to a closed state, the open state being a state in which the touch panel is viewable, the closed state being a state in which the display unit is viewable and at least part of the touch panel is covered by the first body;

determining, when the detection unit detects the switching of the state, whether the touch panel has detected contact made thereon between the most recent switching from the closed state to the open state and the detected switching from the open state to the closed state and the detected contact was made thereon within a predetermined time period before the detected switching from the open state to the closed state; and performing continuous displaying when a result of the determination is positive, the continuous displaying being processing for causing the display unit to display an image that is the same as an image that has been displayed on the touch panel prior to the detection.

6. A display processing method used in a mobile terminal including a first body and a second body, the bodies being movable relative to each other, the mobile terminal comprising:

a display unit provided on the first body and configured to display an image; and a touch panel provided on the second body, and configured to display an image and to detect contact made thereon; wherein the display processing method comprises the steps of:

detecting switching of a state of the mobile terminal from an open state to a closed state, the open state being a state in which the touch panel is viewable, the closed state being a state in which the display unit is viewable and at least part of the touch panel is covered by the first body;

determining, when the detection unit detects the switching of the state, whether the touch panel has detected contact made thereon between the most recent switching from the closed state to the open state and the detected switching from the open state to the closed state and the detected contact was made thereon within a predetermined time period before the detected switching from the open state to the closed state; and performing continuous displaying when a result of the determination is positive, the continuous displaying being processing for causing the display unit to display an image that is the same as an image that has been displayed on the touch panel prior to the detection.

* * * * *